United States Patent
Hattori et al.

(10) Patent No.: US 11,110,822 B2
(45) Date of Patent: Sep. 7, 2021

(54) SLIDING DEVICE

(71) Applicant: TOYOTA BOSHOKU KABUSHIKI KAISHA, Aichi (JP)

(72) Inventors: Takashi Hattori, Aichi (JP); Motohisa Nakamura, Gifu (JP); Takuya Mizuno, Aichi (JP); Tsutomu Oya, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/749,197

(22) Filed: Jan. 22, 2020

(65) Prior Publication Data

US 2020/0238857 A1  Jul. 30, 2020

(30) Foreign Application Priority Data

Jan. 25, 2019 (JP) .............................. JP2019-011284

(51) Int. Cl.
*B60N 2/07* (2006.01)
(52) U.S. Cl.
CPC ......... *B60N 2/0715* (2013.01); *B60N 2/0727* (2013.01); *B60N 2/0707* (2013.01)
(58) Field of Classification Search
USPC .............. 248/424, 429, 419, 420; 296/65.11, 296/65.13, 65.01
See application file for complete search history.

(56) References Cited

U.S. PATENT DOCUMENTS

| | | | | |
|---|---|---|---|---|
| 4,776,551 A | * | 10/1988 | Nishino | B60N 2/0705 248/429 |
| 5,106,144 A | * | 4/1992 | Hayakawa | B60N 2/071 248/429 |
| 5,915,660 A | * | 6/1999 | Kanda | B60N 2/071 248/430 |
| 6,464,194 B1 | * | 10/2002 | Armo | B60N 2/0705 248/430 |
| 8,196,888 B2 | | 6/2012 | Yamada et al. | |
| 2010/0327138 A1 | | 12/2010 | Yamada et al. | |
| 2015/0034791 A1 | * | 2/2015 | Yamada | B60N 2/0843 248/429 |

FOREIGN PATENT DOCUMENTS

JP            5239332        7/2013

* cited by examiner

*Primary Examiner* — Alfred J Wujciak
(74) *Attorney, Agent, or Firm* — Greenblum & Bernstein, P.L.C.

(57) ABSTRACT

One example of a sliding device that can sufficiently reduce a separation phenomenon is disclosed. The sliding device includes a fixed rail, a movable rail, a fixed-side hook, an engagement hook, and a reinforcing hook. The fixed rail is configured to be fixed to a vehicle. To the movable rail, the seat body is attachable. The movable rail is slidable with respect to the fixed rail. The fixed-side hook is configured to be fixed to the vehicle. The engagement hook is provided to the movable rail. The engagement hook is engageable with the fixed-side hook, and is formed by a first plate material curved approximately into a letter J or U shape. The reinforcing hook overlaps with the engagement hook in a thickness direction of the first plate material. The reinforcing hook is formed by a second plate material curved approximately into a letter J or U shape.

6 Claims, 4 Drawing Sheets

SLIDING DEVICE

CROSS-REFERENCE TO RELATED APPLICATIONS

The present application claims the benefit of Japanese Patent Application No. 2019-0011284 filed on Jan. 25, 2019 with the Japan Patent Office, the entire of which is incorporated herein by reference.

BACKGROUND

The present disclosure relates to a sliding device that supports a seat body of a vehicle seat in a slidable manner.

A sliding device disclosed in, for example, the official gazette of Japanese Patent No. 5239332 includes a hook member provided to a movable rail, such as an upper rail. The hook member engages, in a hooked manner, with a lower hook provided to a fixed rail, such as a lower rail.

In the sliding device, a phenomenon in which the movable rail is lifted up (hereinafter also referred to as a separation phenomenon) is inhibited by the engagement of the hook member and the lower hook. Hereinafter, a load that induces the separation phenomenon is referred to as a separation load.

SUMMARY

The sliding device disclosed in the aforementioned gazette, however, may not be able to sufficiently inhibit the separation phenomenon when a large separation load acts on the movable rail. It is desirable that the present disclosure provides a sliding device that can sufficiently inhibit the separation phenomenon.

One aspect of the present disclosure provides a sliding device configured to support a seat body of a vehicle seat in a slidable manner. The sliding device comprises a fixed rail, a movable rail, a fixed-side hook, an engagement hook, and a reinforcing hook. The fixed rail is configured to be fixed to a vehicle. To the movable rail, the seat body is attachable. The movable rail is slidable with respect to the fixed rail. The fixed-side hook is configured to be fixed to the vehicle. The engagement hook is provided to the movable rail so as to be engageable with the fixed-side hook. The engagement hook is formed by a first plate material curved approximately into a letter J shape or approximately into a letter U shape. The reinforcing hook overlaps with the engagement hook in a thickness direction of the first plate material. The reinforcing hook is formed by a second plate material curved approximately into a letter J shape or approximately into a letter U shape.

Due to this structure, the sliding device is configured to receive a separation load at the engagement hook and the reinforcing hook. Accordingly, the sliding device according to the present disclosure can sufficiently inhibit the separation phenomenon as compared to the sliding device disclosed in the aforementioned publication.

The sliding device may be configured, for example, as described below.

According to one aspect of the present disclosure, the sliding device may further comprise a coupling member and a clamp. The coupling member may penetrate the movable rail or the engagement hook and the reinforcing hook so as to couple the movable rail or the engagement hook with the reinforcing hook. The clamp may be provided to the movable rail and configured to fasten and secure the seat body.

The coupling member may be disposed in a position closer to the clamp than to a distal end of the engagement hook.

Such a structure enables a separation force applied from the clamp to the movable rail to be more reliably transmitted to the reinforcing hook. Accordingly, the sliding device according to the present disclosure can sufficiently inhibit the separation phenomenon as compared to the sliding device disclosed in the aforementioned publication.

According to one aspect of the present disclosure, the distal end of the engagement hook and a distal end of the reinforcing hook may be welded. This makes the engagement hook and the reinforcing hook to behave as an integrated component, sufficiently inhibiting the separation phenomenon.

According to one aspect of the present disclosure, the sliding device may further comprise a step portion formed by the distal end of the engagement hook and the distal end of the reinforcing hook. This improves a workability for welding the engagement hook and the reinforcing hook.

According to one aspect of the present disclosure, the sliding device may further comprise at least one roller that makes the movable rail slidable with respect to the fixed rail. The movable rail may comprise at least one roller bracket supporting the at least one roller. The reinforcing hook may be integrated with the at least one roller bracket. This can facilitate production of the sliding device comprising the reinforcing hook.

According to one aspect of the present disclosure, the reinforcing hook may be located at an end of the movable rail in a sliding direction. This more reliably reinforces the portion of the movable rail on which the separation load is highly likely to be applied.

BRIEF DESCRIPTION OF THE DRAWINGS

Some embodiments of the present disclosure will be described hereinafter by way of example with reference to the accompanying drawings, in which.

DETAILED DESCRIPTION OF EXEMPLARY EMBODIMENTS

Figure 1:
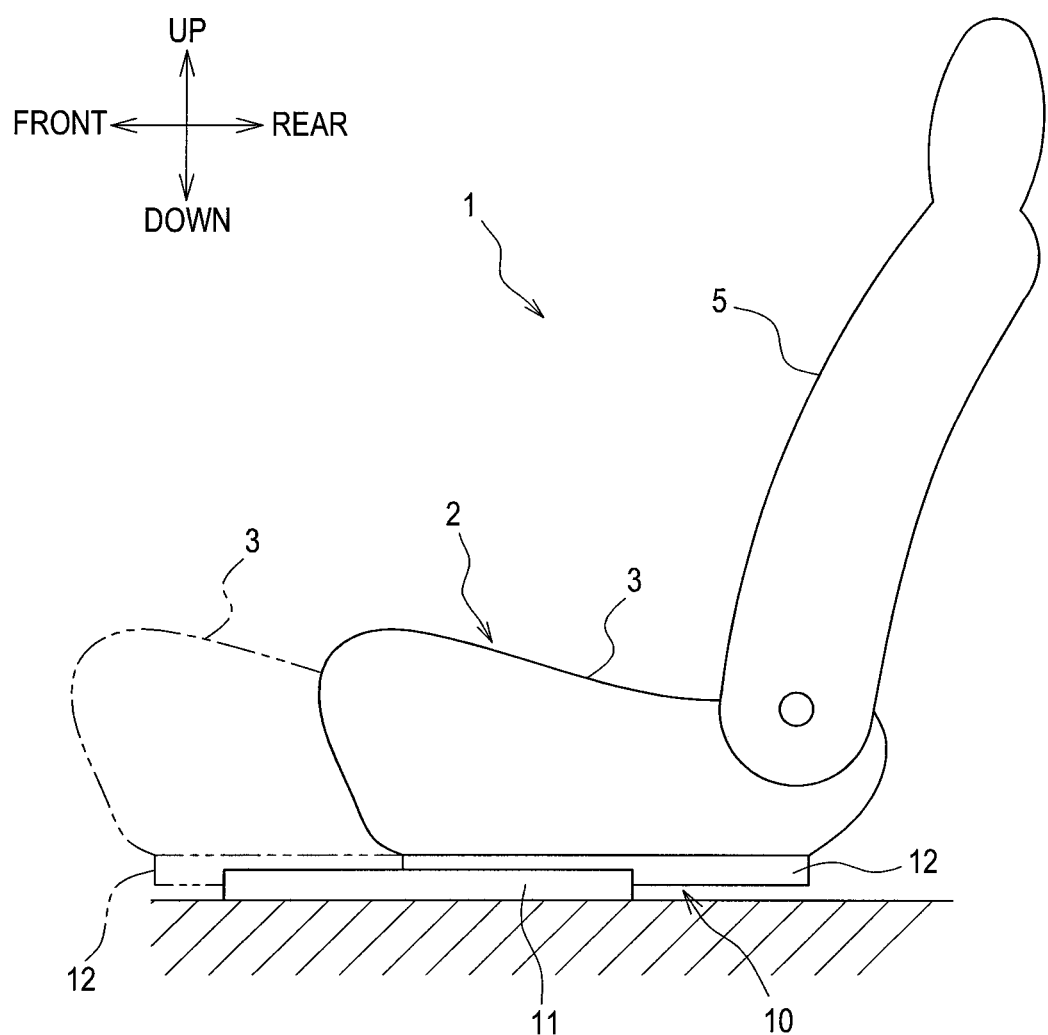
FIG. 1 is a diagram showing a vehicle seat according to a first embodiment.

Embodiments below describe examples of embodiments within the technical scope of the present disclosure. In other words, matters specifying the invention recited in the appended claims are not limited to specific configurations and structures to be described below.

The embodiments below relate to a seat to be installed in a vehicle such as an automobile (hereinafter referred to as a vehicle seat). Arrows indicating the directions, hatched lines, and so on in the drawings are made for easy understanding of the relations between the drawings, the shapes of constituent members or portions, and so on.

Accordingly, the sliding device is not limited by the directions shown in the drawings. The directions shown in the figures are based on a state in which the vehicle seat according to the embodiments below is installed in the automobile.

In regard at least to a member or a portion provided with a reference numeral and explained below, there is at least one such member or portion unless it is specified, for example, that there is only one such member or portion. In other words, two or more of such members or portions may be provided if the number is not specified to be only one. The sliding device according to the present disclosure comprises at least components, such as the members or portions, provided with reference numerals and to be explained below.

First Embodiment

1. Overview of Vehicle Seat (see FIG. 1)

A vehicle seat 1 according to the present embodiment at least comprises two sliding devices 10 and a seat body 2. The seat body 2 at least includes a seat cushion 3 and a seatback 5.

The seat cushion 3 supports the buttocks of an occupant. The seatback 5 supports the back of the occupant. The two sliding devices 10 support the seat body 2 of the vehicle seat 1 in a slidable manner.

The seat body 2 is slidably supported by the two sliding devices 10. Specifically, among the two sliding devices 10, a first sliding device 10 supports a first end of the seat body 2 in a seat width direction, and a second sliding device 10 supports a second end of the seat body 2 in the seat width direction.

2. Structure of Sliding Devices

<Overview of Sliding Devices>

In the present embodiment, the two sliding devices 10 have identical structures. The following description is directed to the sliding device 10 disposed on the left side in the seat width direction. As shown in FIGS. 1 to 4, the sliding device 10 at least comprises a fixed rail 11, a movable rail 12, engagement hooks 13, and reinforcing hooks 14.

<Fixed Rail and Movable Rail>

As shown in FIG. 1, the fixed rail 11 is fixed to the vehicle. The fixed rail 11 extends in a front-rear direction of the vehicle seat 1. In the present embodiment, an extending direction of the fixed rail 11 corresponds to a front-rear direction of the vehicle.

The movable rail 12 is slidable with respect to the fixed rail 11. The seat body 2 is attached to the movable rail 12. Accordingly, the seat body 2 is slidable together with the movable rail 12 in the front-rear direction of the vehicle seat 1 (in the front-rear direction of the vehicle in the present embodiment).

Figure 2:
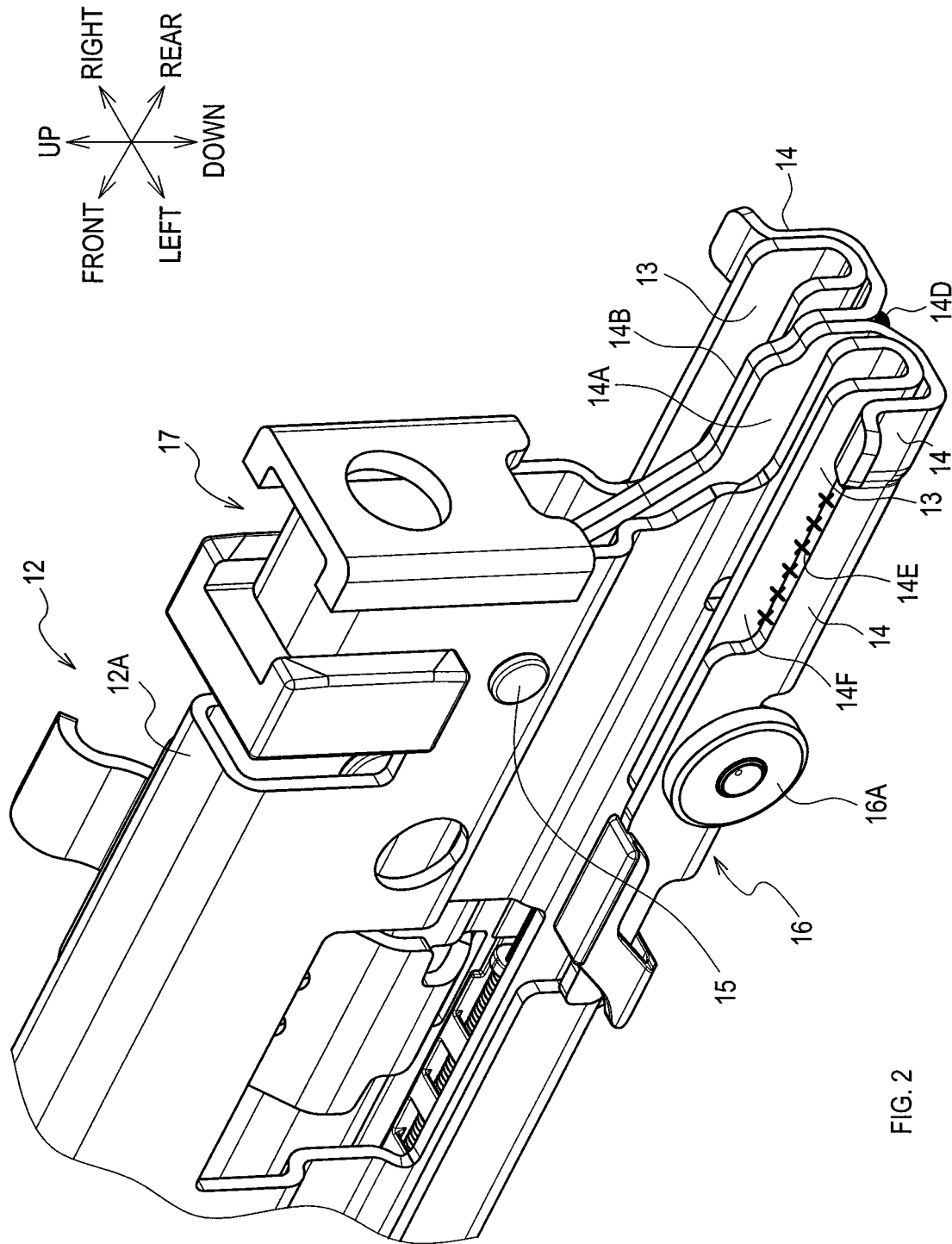
FIG. 2 is a diagram showing a movable rail according to the first embodiment.
Figure 3:
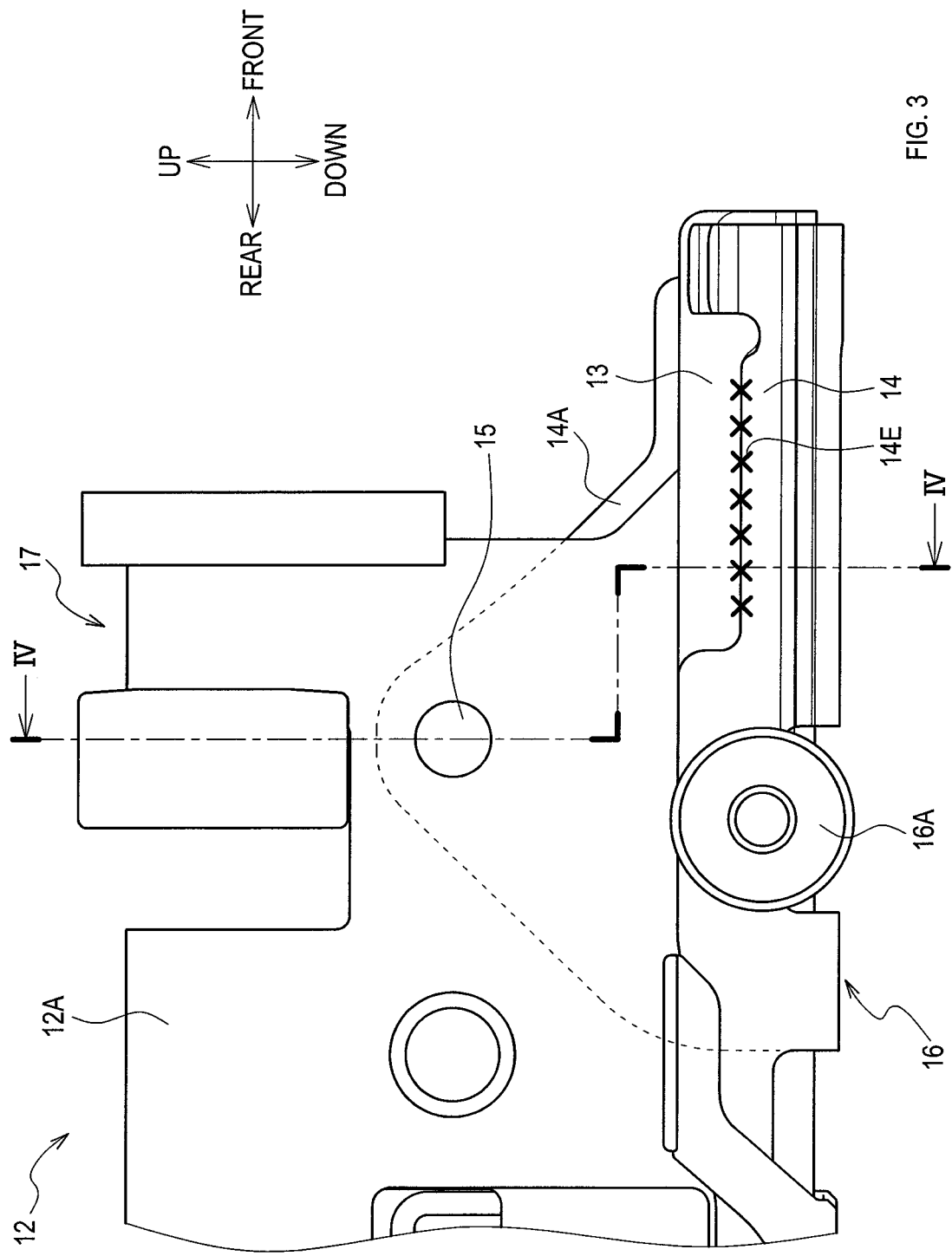
FIG. 3 is a diagram showing the movable rail according to the first embodiment.

As shown in FIG. 2, at least one roller 16A and at least one roller bracket 16 (two rollers 16A and two roller brackets 16 in the present embodiment) are provided at least at the rear end of the movable rail 12 in a sliding direction.

The two rollers 16A are one example of rolling elements and make roll contact with the fixed rail 11 enabling the movable rail 12 to be slidable. The roller brackets 16 are fixed to the movable rail 12 while supporting the two rollers 16A.

<Engagement Hooks>

Figure 4:
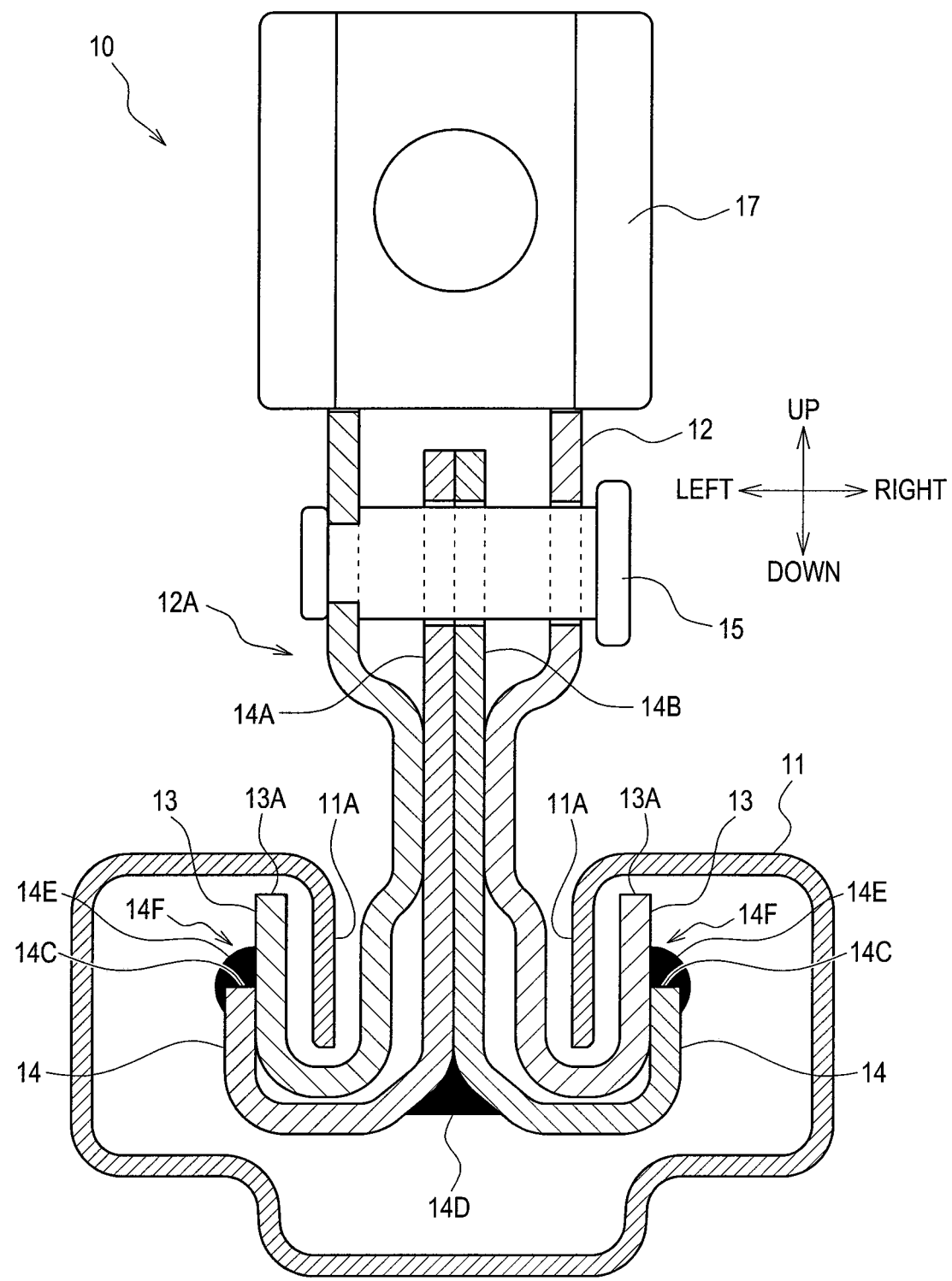
FIG. 4 is a sectional view taken along a line IV-IV in FIG. 3.

As shown in FIG. 4, the engagement hooks 13 and the reinforcing hooks 14 are portions of the movable rail 12. In the present embodiment, more than one engagement hook 13 and more than one reinforcing hook 14 are provided.

Specifically, the two engagement hooks 13 are provided to a main body portion 12A of the movable rail 12. Among the engagement hooks 13, a first engagement hook 13 is disposed at the left lower end of the main body portion 12A, while a second engagement hook 13 is disposed at the right lower end of the main body portion 12A.

The first engagement hook 13 and the second engagement hook 13 have symmetrical structures. Thus, when the first engagement hook 13 (hereinafter abbreviated as the engagement hook 13), for example, is described below, description of the second engagement hook 13 will be omitted.

The engagement hook 13 is formed by a first plate material curved approximately into a letter J shape or a letter U shape. The engagement hook 13 can be engaged with a fixed-side hook 11A. The fixed-side hook 11A is fixed to the vehicle. The fixed-side hook 11A is formed approximately into a letter J shape or a letter U shape.

The fixed-side hook 11A according to the present embodiment is provided to the fixed rail 11. In other words, the fixed-side hook 11A is fixed to the vehicle through the fixed rail 11. The engagement hook 13 according to the present embodiment is formed by a metal plate material so as to be integrated with the main body portion 12A. The fixed-side hook 11A is integrally formed with the fixed rail 11.

<Reinforcing Hooks>

The two reinforcing hooks 14 are provided to the main body portion 12A of the movable rail 12. Among the two reinforcing hooks 14, a first reinforcing hook 14 is disposed at the left lower end of the main body portion 12A, while a second reinforcing hook 14 is disposed at the right lower end of the main body portion 12A.

The first reinforcing hook 14 and the second reinforcing hook 14 have symmetrical structures. Thus, when the first reinforcing hook 14 (hereinafter abbreviated as the reinforcing hook 14), for example, is described below, description of the second reinforcing hook 14 will be omitted unless otherwise necessary.

The reinforcing hooks 14 are formed by plate materials each curved approximately into a letter J shape or a letter U shape, and are disposed so as to overlap with the engagement hooks 13 in thickness directions of the first plate materials forming the engagement hooks 13. Specifically, the first reinforcing hook 14 is formed by a second plate material 14A, while the second reinforcing hook 14 is formed by a third plate material 14B.

As shown in FIG. 2, the plate materials 14A, 14B are members that also form the roller brackets 16. In other words, in the present embodiment, the two reinforcing hooks 14 are integrated with the roller brackets 16 provided at the rear end of the movable rail 12 in the sliding direction.

<Fixing Structures of Reinforcing Hooks>

As shown in FIG. 4, while being disposed inside the main body portion 12A, the plate materials 14A, 14B are fixed to the main body portion 12A and the engagement hooks 13.

That is, the plate materials 14A, 14B are coupled and fixed to the main body portion 12A at least by a coupling member 15. The coupling member 15 penetrates the main body portion 12A and the plate materials 14A, 14B to couple and fasten the movable rail 12, specifically the two engagement hooks 13 and the two reinforcing hooks 14.

In other words, the coupling member 15 penetrates the movable rail 12 or the two engagement hooks 13 and the two reinforcing hooks 14 so as to couple the movable rail 12 or the two engagement hooks 13 with the two reinforcing hooks 14.

While penetrating the main body portion 12A and the plate materials 14A, 14B in the seat width direction, the coupling member 15 is swaged at a first end (at the left end in FIG. 4). The second plate material 14A and the third plate material 14B are integrated at their lower ends. Specifically, the second plate material 14A and the third plate material 14B are combined at a welded portion 14D.

The coupling member 15 is located in a position closer to a clamp 17 than to distal ends 13A of the two engagement hooks 13. The clamp 17 is a portion of the movable rail 12 (the main body portion 12A). The seat body 2 is secured to the clamp 17 by fastening.

The distal ends 13A of the engagement hooks 13 are welded with distal ends 14C of the reinforcing hooks 14 at welded portions 14E. The welded portions 14E are disposed at step portions 14F. The step portions 14F are provided at the distal ends 14C of the reinforcing hooks 14.

The step portions 14F are formed due to the distal ends 13A of the engagement hooks 13 being out of alignment and located upward relative to the distal ends 14C of the reinforcing hooks 14. The welded portions 14E extend in the sliding direction so as to fill the step portions 14F (see FIG. 2).

Features of Vehicle Seat (Particularly, Sliding Devices) According to Present Embodiment The sliding devices 10 each comprise the engagement hooks 13, and the reinforcing hooks 14 that overlap with the engagement hooks 13 in the thicknesses directions of the first plate materials forming the engagement hooks 13. Due to this structure, the sliding devices 10 are configured to receive a separation load at the engagement hooks 13 and the reinforcing hooks 14. Accordingly, a separation phenomenon can be sufficiently inhibited in the sliding devices 10.

The sliding devices 10 each comprise the coupling member 15 coupling the two engagement hooks 13 and the two reinforcing hooks 14. The coupling member 15 is located in a position closer to the clamp 17 than to the distal ends 13A of the two engagement hooks 13.

This structure allows more reliable transmission of the separation force, applied from the clamp 17 to the movable rail 12, to the two reinforcing hooks 14. Accordingly, the separation phenomenon can be sufficiently inhibited in the sliding devices 10.

The distal ends 13A of the engagement hooks 13 are welded with the distal ends 14C of the reinforcing hooks 14. Thus, the two engagement hooks 13 and the two reinforcing hooks 14 behave as an integrated component, enabling sufficient reduction of the separation phenomenon.

The sliding devices 10 are each provided with the step portions 14F formed by the out-of-alignment of the distal ends 13A of the engagement hooks 13 with the distal ends 14C of the reinforcing hooks 14. Due to this structure, a workability for welding the engagement hooks 13 and the reinforcing hooks 14 is improved.

The reinforcing hooks 14 are integrated with the roller brackets 16, thereby facilitating production of the sliding devices 10 comprising the reinforcing hooks 14.

Moreover, the two reinforcing hooks 14 are located at the rear end of the movable rail 12 in the sliding direction, thereby more reliably reinforcing the portions of the movable rail 12 on which the separation load is likely to be applied.

Other Embodiments

For example, the movable rail 12 and the reinforcing hooks 14 may be integrated by welding.

For example, the coupling member 15 may be disposed below the distal ends 13A of the engagement hooks 13.

For example, the distal ends 13A of the engagement hooks 13 and the distal ends 14C of the reinforcing hooks 14 may be integrated by swaging or by mechanical fastening structures such as screws or rivets.

For example, the sliding device 10 may have no step portion 14F.

For example, the reinforcing hooks 14 and the roller brackets 16 may be formed by separate members.

For example, the reinforcing hooks 14 may be located at the front end of the movable rail 12 in the sliding direction.

For example, the fixed-side hooks 11A may be provided as separate members from the fixed rail 11.

The present disclosure can be applied to seats used in other vehicles such as railroad vehicles, ships, boats, and aircrafts, and to stationary seats used in theaters and at homes, and other places.

Furthermore, the present disclosure is only required to conform to the gist of the invention described in the above-described embodiments, and thus is not limited to the aforementioned embodiments. Accordingly, the present disclosure may be configured in combination of at least two of the aforementioned embodiments, or may be configured without some of the components illustrated in the drawings or described with reference numerals in the aforementioned embodiments.

What is claimed is:

1. A sliding device configured to support a seat body of a vehicle seat in a slidable manner, the sliding device comprising:
    a fixed rail configured to be fixed to a vehicle;
    a movable rail to which the seat body is attachable, the movable rail being slidable with respect to the fixed rail;
    a fixed-side hook configured to be fixed to the fixed rail;
    an engagement hook provided to the movable rail so as to be engageable with the fixed-side hook, the engagement hook including a first plate material curved approximately into a letter J shape or approximately into a letter U shape;
    a reinforcing hook overlapping with the engagement hook in a thickness direction of the first plate material, the reinforcing hook including a second plate material curved approximately into a letter J shape or approximately into a letter U shape, and
    a coupling member configured to penetrate the movable rail or the engagement hook, penetrate the reinforcing hook, and couple the movable rail or the engagement hook with the reinforcing hook; and a clamp provided to the movable rail and configured to fasten and secure the seat body, wherein the coupling member is disposed in a position closer to the clamp than to a distal end of the engagement hook.

2. The sliding device according to claim 1, wherein the distal end of the engagement hook and a distal end of the reinforcing hook are welded.

3. The sliding device according to claim 2 further comprising a step portion formed by the distal end of the engagement hook and the distal end of the reinforcing hook.

4. The sliding device according to claim 1 further comprising at least one roller that makes the movable rail slidable with respect to the fixed rail,
    wherein the movable rail comprises at least one roller bracket supporting the at least one roller, and
    wherein the reinforcing hook is integrated with the at least one roller bracket.

5. The sliding device according to claim 1, wherein the reinforcing hook is located at an end of the movable rail in a sliding direction.

6. The sliding device according to claim 5, wherein the engagement hook is located at the end of the movable rail in the sliding direction.

\* \* \* \* \*